United States Patent
Zhao et al.

(10) Patent No.: US 11,602,858 B2
(45) Date of Patent: Mar. 14, 2023

(54) THUMB STRUCTURE AND ROBOT

(71) Applicant: UBTECH ROBOTICS CORP LTD, Shenzhen (CN)

(72) Inventors: Kunlei Zhao, Shenzhen (CN); Zheng Xie, Shenzhen (CN); Zhaohui An, Shenzhen (CN); Weizhi Shi, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 254 days.

(21) Appl. No.: 17/216,716

(22) Filed: Mar. 30, 2021

(65) Prior Publication Data

US 2021/0370522 A1 Dec. 2, 2021

(30) Foreign Application Priority Data

May 26, 2020 (CN) .......................... 202010454860.8

(51) Int. Cl.
*B25J 15/00* (2006.01)
*B25J 15/02* (2006.01)

(52) U.S. Cl.
CPC ......... *B25J 15/0009* (2013.01); *B25J 15/022* (2013.01)

(58) Field of Classification Search
CPC .. B25J 15/0009; B25J 15/022; B25J 15/0433; B25J 15/08; B25J 15/0233
USPC ................................................ 294/86.4, 213
See application file for complete search history.

(56) References Cited

U.S. PATENT DOCUMENTS

| | | | | |
|---|---|---|---|---|
| 4,821,594 A | * | 4/1989 | Rosheim | B25J 17/0266 901/28 |
| 4,834,761 A | * | 5/1989 | Walters | B25J 17/0275 623/64 |
| 5,261,715 A | * | 11/1993 | Blatt | F16M 11/10 269/71 |
| 5,447,403 A | * | 9/1995 | Engler, Jr. | B25J 15/0009 294/111 |
| 5,967,580 A | * | 10/1999 | Rosheim | B25J 17/0275 901/29 |
| 8,419,096 B2 | * | 4/2013 | Kim | B25J 9/104 294/111 |
| D865,831 S | * | 11/2019 | Kawaguchi | D15/199 |
| 10,857,681 B2 | * | 12/2020 | Liu | F16H 25/20 |
| 2003/0146898 A1 | * | 8/2003 | Kawasaki | B25J 13/081 345/156 |
| 2021/0370523 A1 | * | 12/2021 | Zhao | B25J 15/0206 |
| 2022/0143842 A1 | * | 5/2022 | Lo | B25J 15/0009 |

* cited by examiner

*Primary Examiner* — Paul T Chin

(57) ABSTRACT

A thumb structure includes a proximal phalanx, a distal phalanx rotatably connected to one end of the proximal phalanx, a fixing member connected to the proximal phalanx through a first ball joint, a linking member having opposite ends that are connected to the distal phalanx and the fixing member through a second ball joint and a third ball joint, a first actuating assembly to drive the proximal phalanx to swing in a direction of a first degree of freedom, and a second actuating assembly to drive the proximal phalanx to swing in a direction of a second degree of freedom.

20 Claims, 10 Drawing Sheets

THUMB STRUCTURE AND ROBOT

CROSS REFERENCE TO RELATED APPLICATIONS

This application claims priority to Chinese Patent Application No. CN202010454860.8, filed May 26, 2020, which is hereby incorporated by reference herein as if set forth in its entirety.

BACKGROUND

1. Technical Field

The present disclosure generally relates to robots, and particularly to a thumb structure of a robot and a robot having the thumb structure.

2. Description of Related Art

One conventional robot has a thumb that includes a proximal phalanx, a distal phalanx, and two servos for actuating movement of the two phalanges. One servo is arranged between the proximal phalanx and the distal phalanx to actuate the movement of the distal phalanx, and the other is arranged at one end of the proximal phalanx to actuate the movement of the proximal phalanx. The thumb is bulky due to the huge size of the servos, which is not conducive to the compactness of the hands of the robot. Since the servo is arranged between the proximal and distal phalanges, the resistance moment of the proximal and distal phalanges relative to the lower end of the proximal phalanx is relatively large, which may result in a relatively small output of the servo at the lower end of the proximal phalanx.

Therefore, there is a need to provide a thumb structure to overcome the above-mentioned problems.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
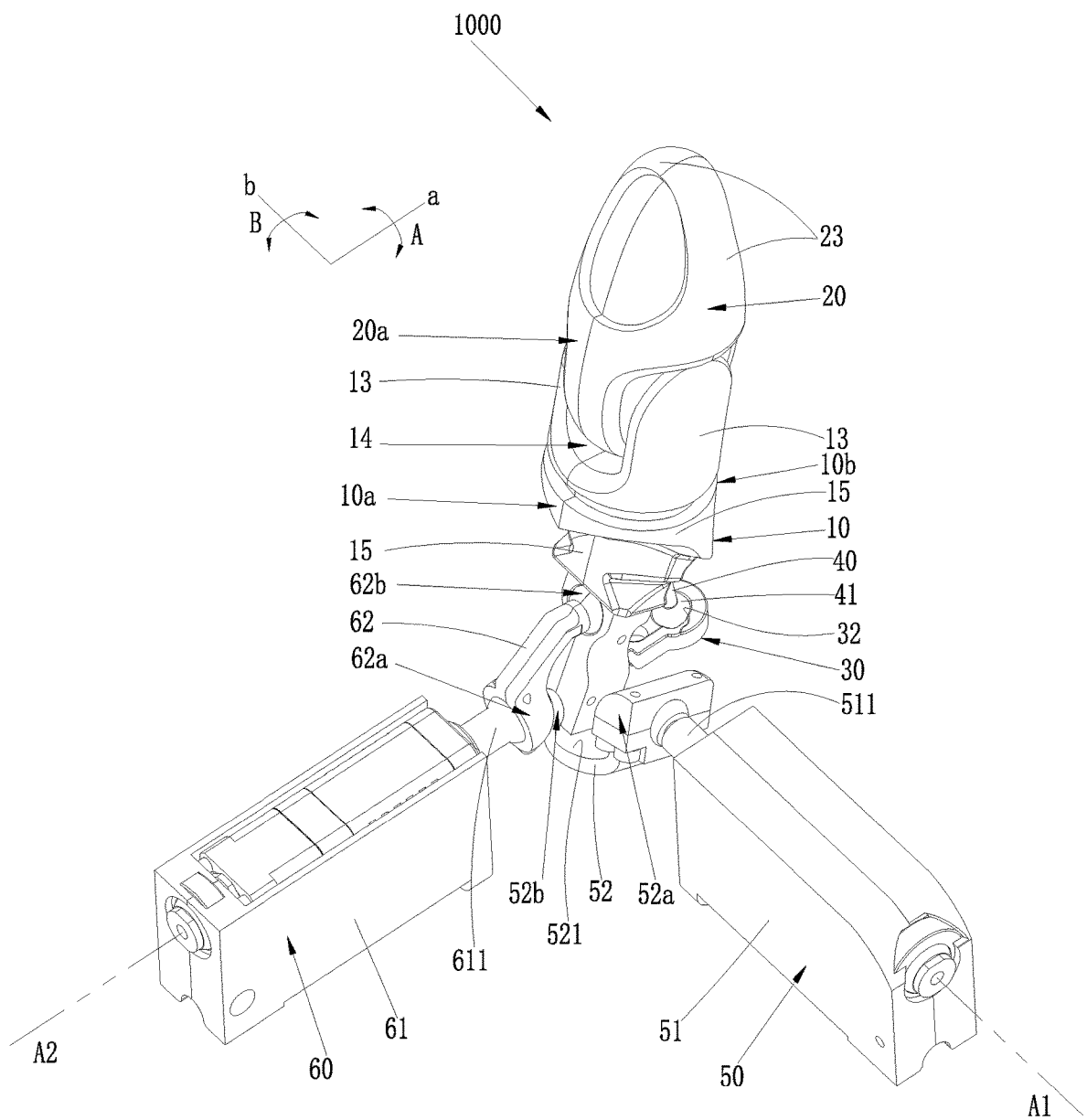
FIG. 1 is a schematic isometric view of a thumb structure according to one embodiment.
Figure 2:
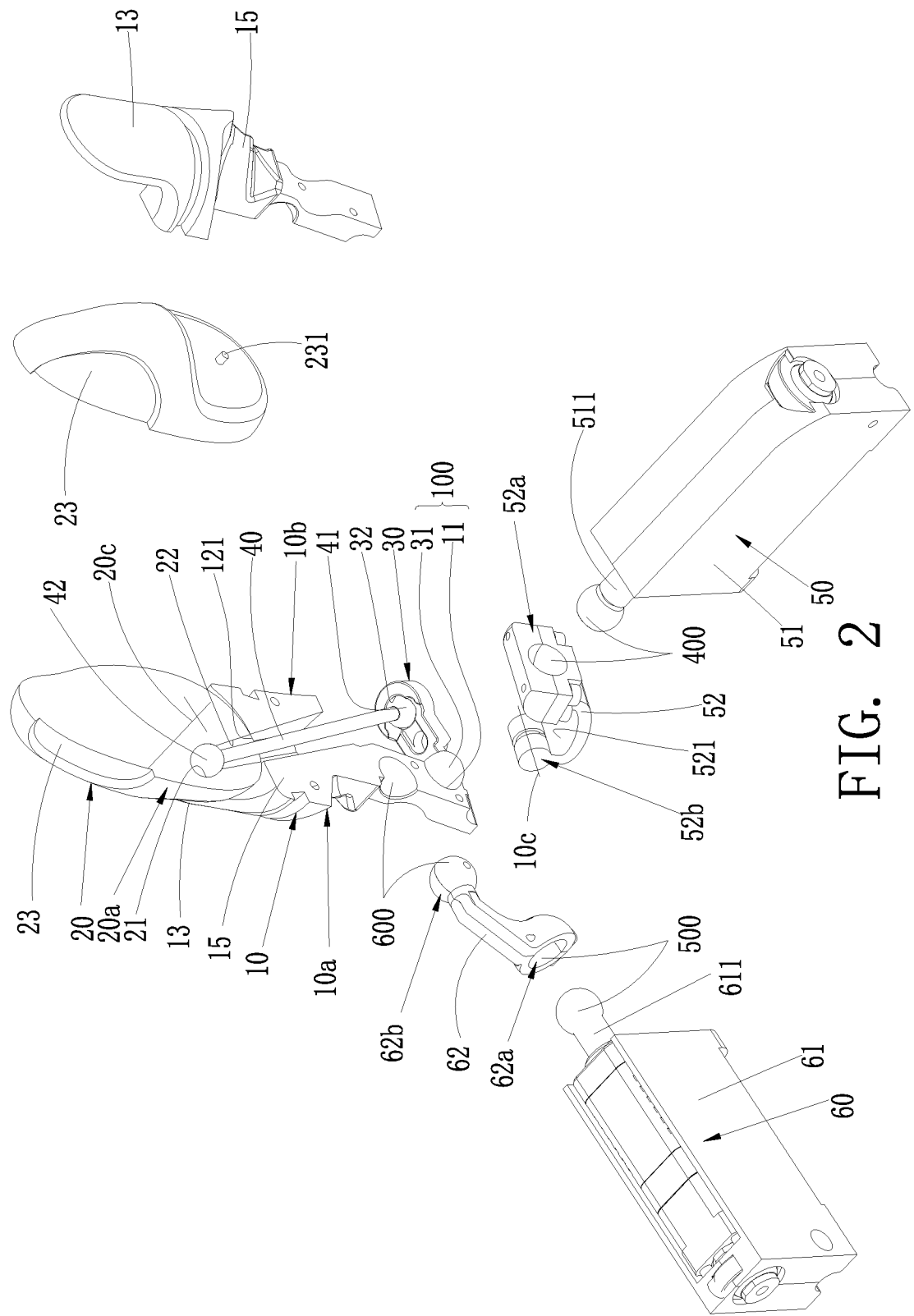
FIG. 2 is a schematic exploded view of the thumb structure.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Referring to FIG. 1, the palm in a straight state after a thumb structure of the present disclosure has been assembled is used as a reference to define a front side 10a and a back side 10b. The side on the same side as the back of the hand is the front side 10a, and the side on the same side as the back of the hand is the back side 10b. For example, the front side 10a of the proximal phalanx 10 shown in FIG. 1 is the side on the same side as the palm of the hand when the thumb structure is in a straightened state, and the back side 10b of the proximal phalanx 10 and the front side 10a of the proximal phalanx 10 are arranged opposite to each other.

Referring to FIGS. 1-4, in one embodiment, a thumb structure 1000 of a robot includes a proximal phalanx 10, a distal phalanx 20, a fixing member 30, a linking member 40, a first actuating assembly 50, and a second actuating assembly 60. The distal phalanx 20 is rotatably connected to one end of the proximal phalanx 10. The fixing member 30 is connected to the proximal phalanx 10 by a first ball joint 100. The linking member 40 has two opposite ends that are connected to the distal phalanx 20 and the fixing member 30 by a second ball joint 200 and a third ball joint 300. The first actuating assembly 50 is configured to drive the proximal phalanx 10 to swing in a direction of a first degree of freedom. The second actuating assembly 60 is configured to drive the proximal phalanx 10 to swing in as direction of a second degree of freedom. A predetermined angle is formed between a center line a of the direction A of the first degree of freedom and a center line b of the direction B of the second degree of freedom. The angle can be can be 80°, 90°, 95°, etc. However, the angle is not limited and can change according to actual needs.

With such configuration, the two actuating assemblies are configured to drive the proximal phalanx 10 to move in parallel, and the driving functions of the two actuating assemblies do not interfere with each other, so that the proximal phalanx 10 has two degrees of freedom and can swing about two axes of rotation. During the movement of the proximal phalanx 10, the linking member 40 and the distal phalanx 20 move, realizing the bending and extending actions of the distal phalanx 20 (see FIGS. 7-9). Compared with conventional serial thumb joints, the two actuating assemblies of the thumb structure of the present disclosure can be placed relatively close to each other, so that the thumb structure takes up less space and can have an anthropomorphic appearance. The proximal phalanx 10 and the distal phalanx 20 have a large range of motion and have good adaptability. Since there is no distal phalanx servo having a certain weight and arranged between the proximal phalanx 10 and the distal phalanx 20 for actuating the movement of the distal phalanx, the resistance moment of the proximal phalanx 10 and the distal phalanx 20 relative to the lower end of the proximal phalanx 10 is relatively small. There is no need to perform additional work to overcome the resistance moment brought by the distal phalanx servo. The power consumption is lower and the actuating assemblies can provide a greater output, so that the thumb structure can provide a greater grip.

Figure 5:
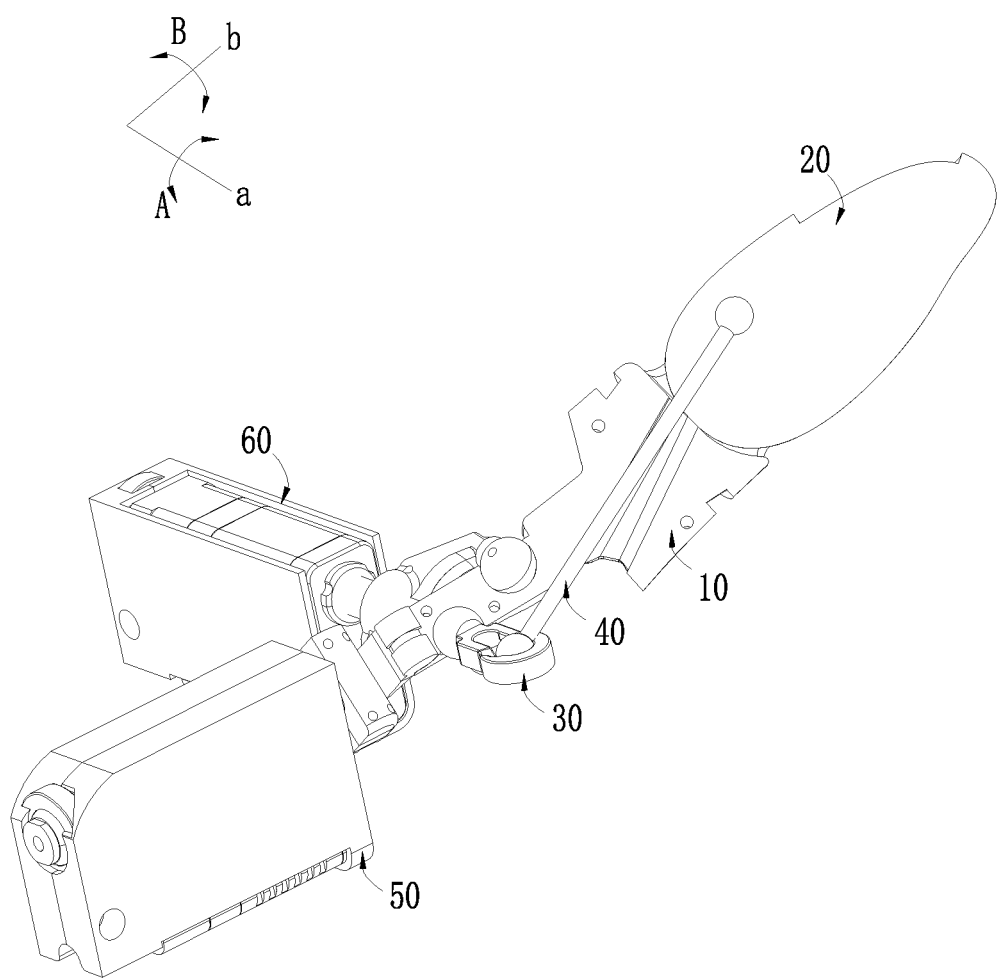
FIG. 5 is a schematic isometric view showing a proximal phalanx swinging in a direction of a first degree of freedom to a first position.
Figure 6:
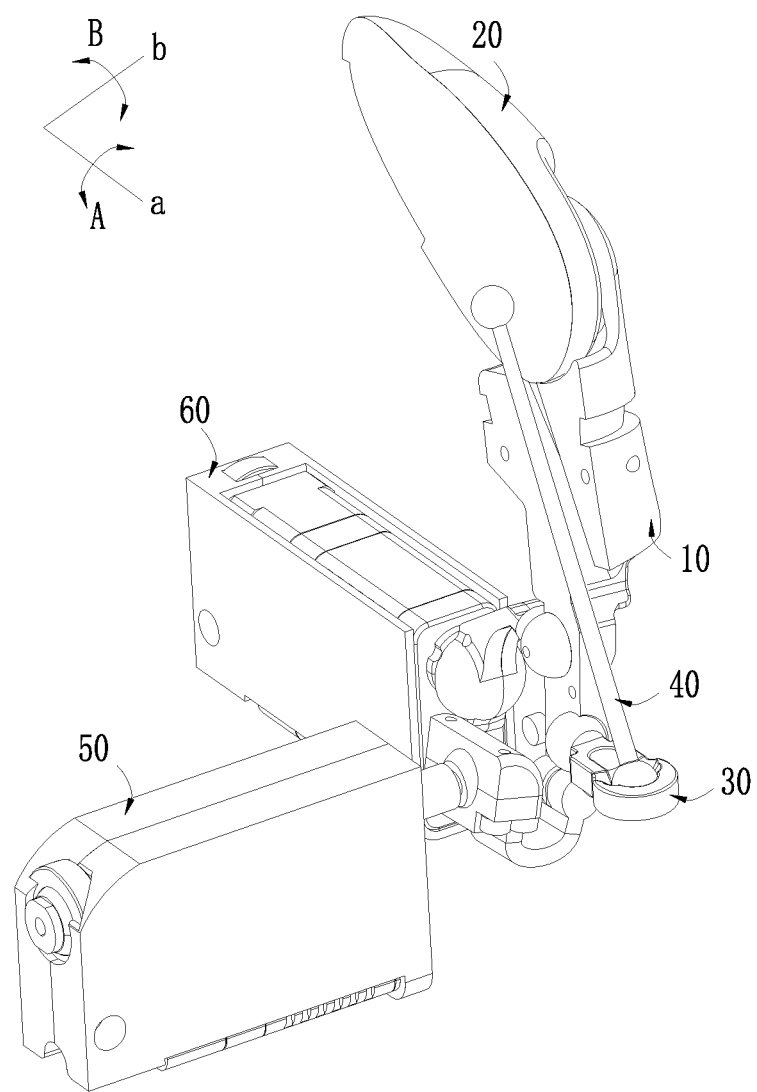
FIG. 6 is similar to FIG. 5, but showing the proximal phalanx swinging in the direction of the first degree of freedom to a second position.

In one embodiment, the first actuating assembly 50 is configured to drive the proximal phalanx 10 to swing from side to side, and cooperates with the fixing member 30 and the linking member 40 to drive the distal phalanx 20 to move together with the proximal phalanx 10 to swing from side to side. For example, as shown in FIG. 5, driven by the first actuating assembly 50, the proximal phalanx 10 swings to the right, and the linking member 40 and the distal phalanx 20 move together with the proximal phalanx 10 and swing to the right. As shown in FIG. 6, driven by the first actuating assembly 50, the proximal phalanx 10 swings to the left, and the linking member 40 and the distal phalanx 20 move together wall the proximal phalanx 10 and swing to the left.

Figure 7:
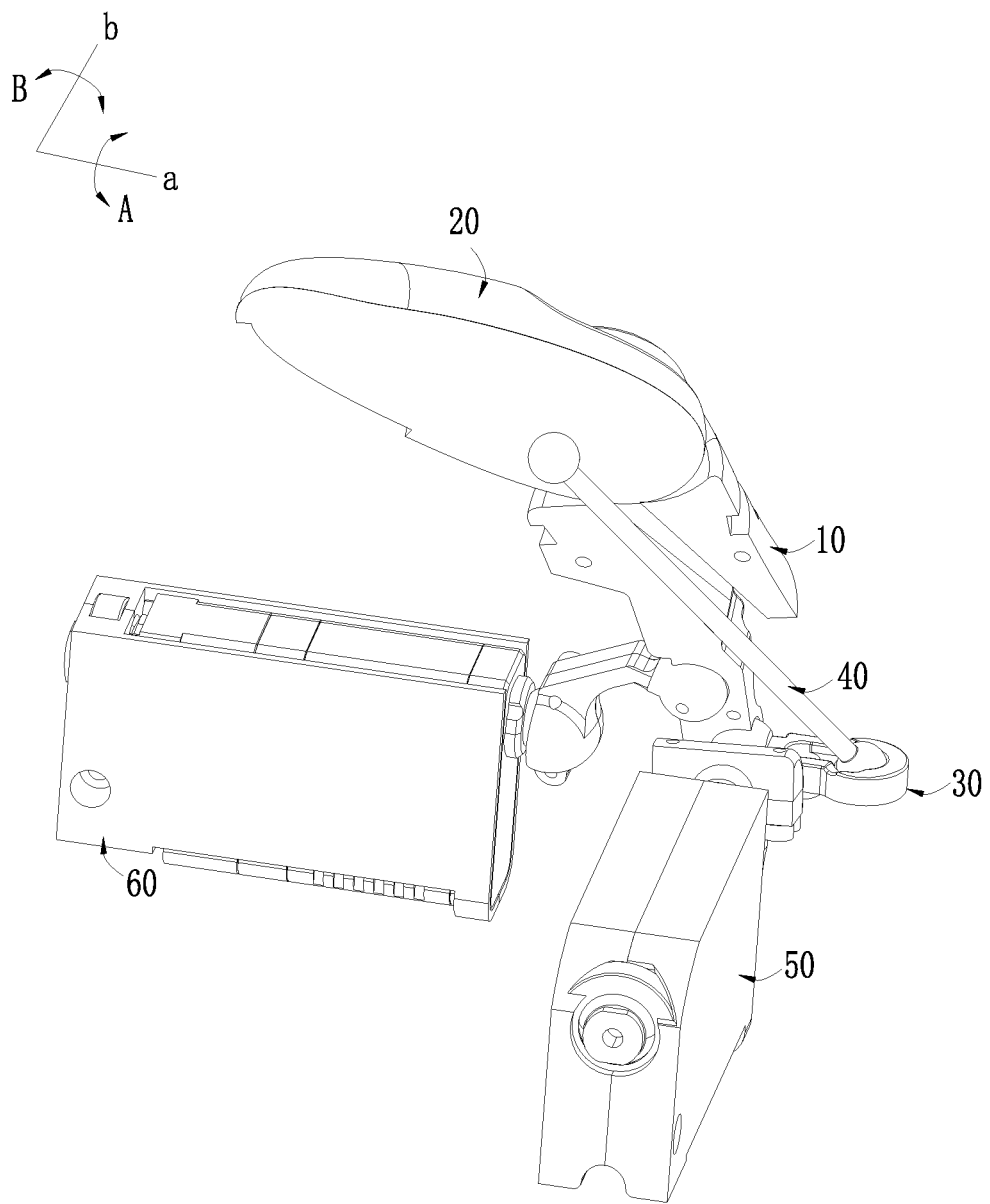
FIG. 7 is a schematic isometric view showing the proximal phalanx swinging in a direction of a second degree of freedom to a first position.
Figure 8:
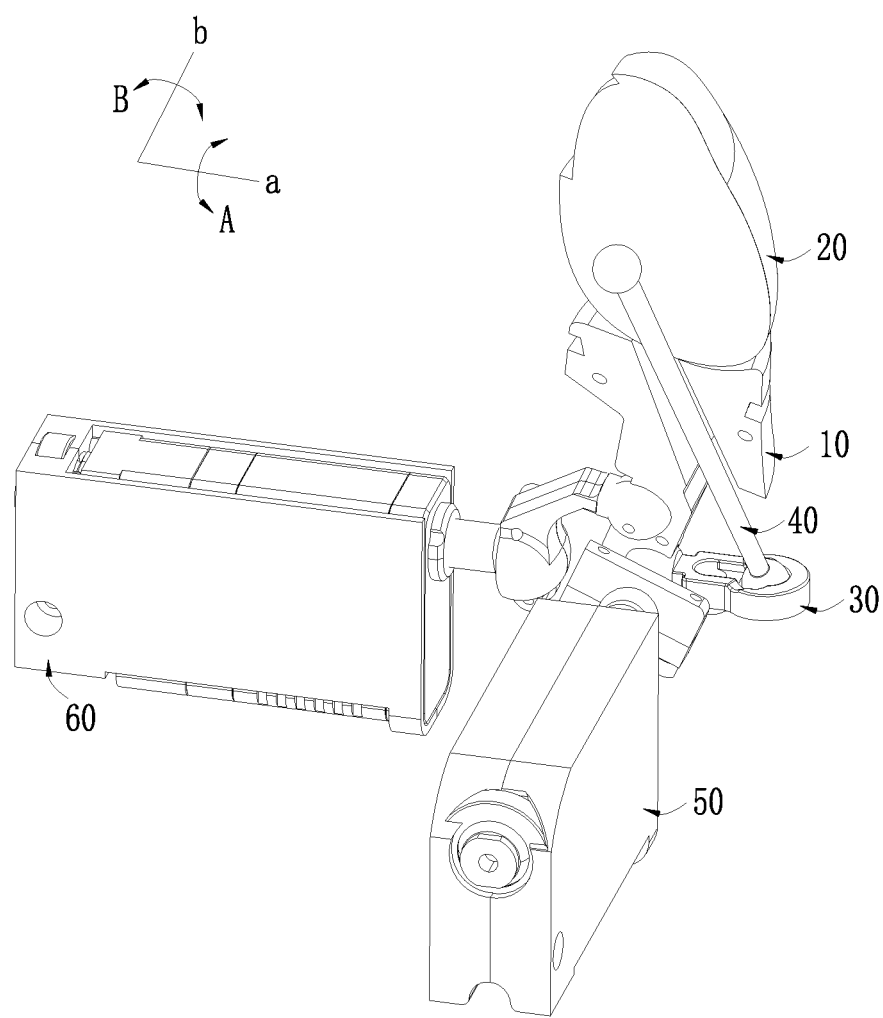
FIG. 8 is similar to FIG. 7, but showing the proximal phalanx swinging in the direction of the second degree of freedom to a second position.

In one embodiment, the second actuating assembly 60 is configured to drive the proximal phalanx 10 to swing back and forth, and cooperates with the fixing member 30 and the linking member 40 to drive the distal phalanx 20 to move together pith the proximal phalanx 10 to swing from side to side. For example, as shown in FIG. 7, driven by the second actuating assembly 60, the proximal phalanx 10 swings to the back, that is, closer to the palm of the hand including the thumb structure. The linking member 40 and the distal phalanx 20 move together with the proximal phalanx 10 and swing to the back, and the distal phalanx 20 is in a flexion state. As shown in FIG. 8, the proximal phalanx 10 swings to the front, that is, a position away from the palm of the hand. The linking member 40 and the distal phalanx 20 move together with the proximal phalanx 10 to swing to the front, and the distal phalanx 20 is in an extension state.

Figure 9:
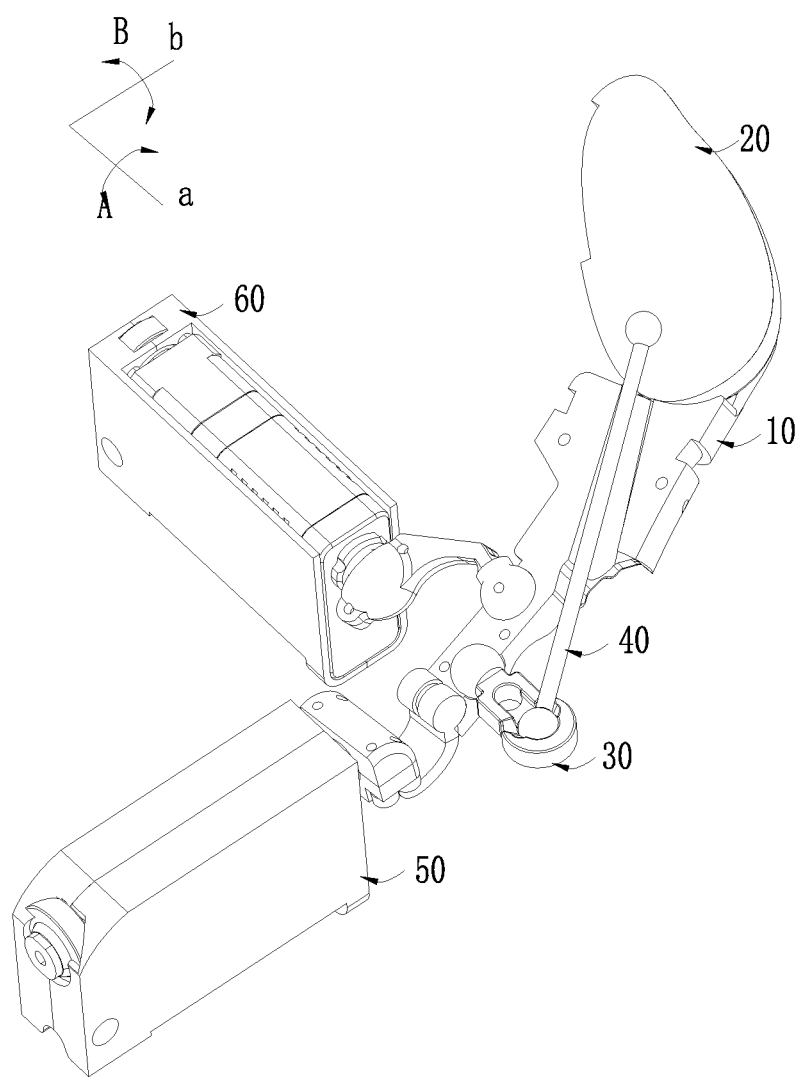
FIG. 9 is a schematic isometric view showing the proximal phalanx swinging in the directions of the first degree of freedom and the second degree of freedom.

Two parallel actuating assemblies can realize the free swing of the proximal phalanx 10, and cooperate with the fixing member 30 and the linking member 40 to realize the free swing of the distal phalanx 20. As shown in FIG. 9, driven by the first actuating assembly 50 and the second actuating assembly 60, the proximal phalanx 10 swings to the right, and the linking member 40 and the distal phalanx 20 move together with the proximal phalanx 10 and swing to the right, and the distal phalanx 20 is in a flexion state. It should be noted that the proximal phalanx 10 can also be swung to the left, while the distal phalanx 20 follows the proximal phalanx 10 and swings to the left, and the distal phalanx 20 is in a flexion state.

Referring to FIGS. 1-4, in one embodiment, the first actuating assembly 50 may include a first linear actuator 51 having a first output shaft 511, and a first transmission rod 52 having two opposite ends that are respectively rotatably connected to the first output shaft 511 and the proximal phalanx 10. With this solution, the proximal phalanx 10 can be controlled to swing in the direction A of the first degree of freedom, and the first linear actuator 51 can accurately output displacement to control the posture of the proximal phalanx 10 in the direction A of the first degree of freedom (see FIGS. 5-6).

The second actuating assembly 60 includes a second linear actuator 61 having a second output shaft 611, and a second transmission rod 62 having opposite ends that are respectively rotatably connected to the second output shaft 611 and the proximal phalanx 10. The first output shaft 511 and the second output shaft 611 extend along two axes A1 and A2 between which an angle is formed. With this solution, the proximal phalanx 10 can be controlled to swing in the direction B of the first degree of freedom, and the second linear actuator 61 can accurately output displacement to control the posture of the proximal phalanx 10 in the direction B of the first degree of freedom (we FIGS. 7-8). The first linear actuator 51 and the second linear actuator 61 may be linear electric cylinders to accurately output the displacement, thereby controlling the movement of the proximal phalanx 10 in two degrees of freedom, and improving the flexibility of the free movement of the proximal phalanx 10. The angle between the axis A1 of the first output shaft 511 and the axis A2 of the second output shaft 611 can be set to 80°, 90°, 95°, etc. However, the angle is not limited other, and can change according to actual needs.

In one embodiment, the first transmission rod 52 has a first end 52a that is connected to the first output shaft 511 by a fourth ball joint 400, and a second end 52b pivotally connected to the proximal phalanx 10. In this way, the mechanical power of the first linear actuator 51 can be transmitted to the proximal phalanx 10, and the proximal phalanx 10 can be driven to swing in the direction A of the first degree of freedom. Since the first transmission rod 52 and the first output shaft 511 are connected by the fourth ball joint 400, the proximal phalanx 10 can move freely during the movement, and will not be interfered by the output of the second actuating assembly 60. Specifically, the first end 52a of the first transmission rod 52 is provided with a spherical socket, and the end of the first output shaft 511 is provided with a ball. The ball is received in the spherical socket to form the fourth ball joint 400 that connects the first transmission rod 52 to the first output shaft 511. The second end 52b of the first transmission rod 52 is rotatably connected to the proximal phalanx 10 through a pivot shall.

The second transmission rod 62 has a first end 62a that is connected to the second output shaft 611 by a fifth ball joint 500, and a second end 62b connected to the proximal phalanx by a sixth ball joint 600. In this way, the mechanical power of the second linear actuator 61 can be transmitted to the proximal phalanx 10, and the proximal phalanx 10 can be driven to swing in the direction B of the first degree of freedom. Since the second transmission rod 62 and the second output shaft 611 are connected by a ball joint, the second transmission rod 62 and the proximal phalanx 10 are connected by a ball joint, the proximal phalanx 10 can move freely during movement and will not be interfered by the output of the first actuating assembly 50. The ball joints connecting the second transmission rod 62 to the proximal phalanx 10 and the second output shaft 611 are similar to the ball joint that connects the first transmission rod 52 to the first output shaft 511 described above, and will not be repeated herein.

Figure 3:
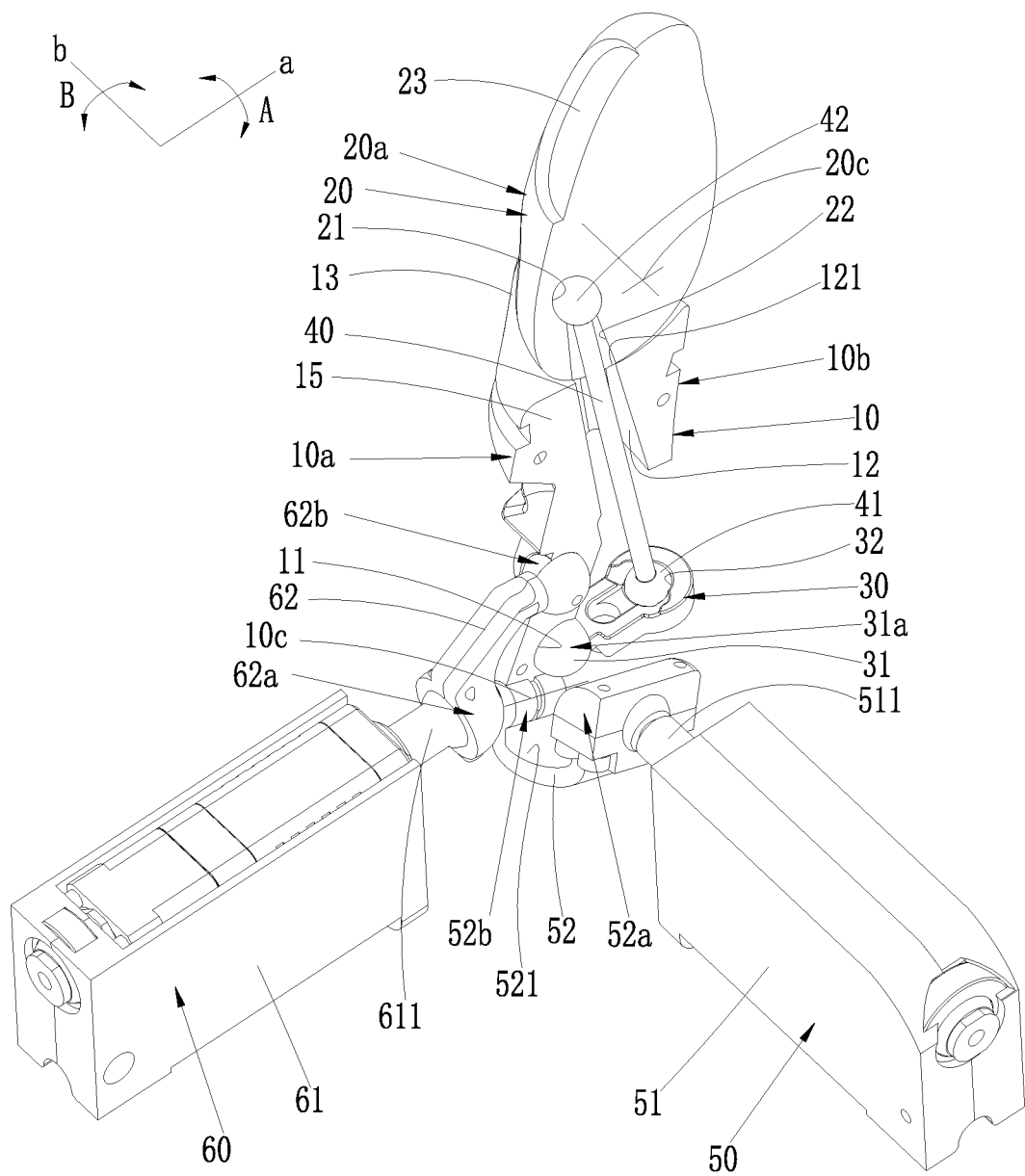
FIG. 3 is similar to FIG. 1, with certain components omitted for clarity.
Figure 4:
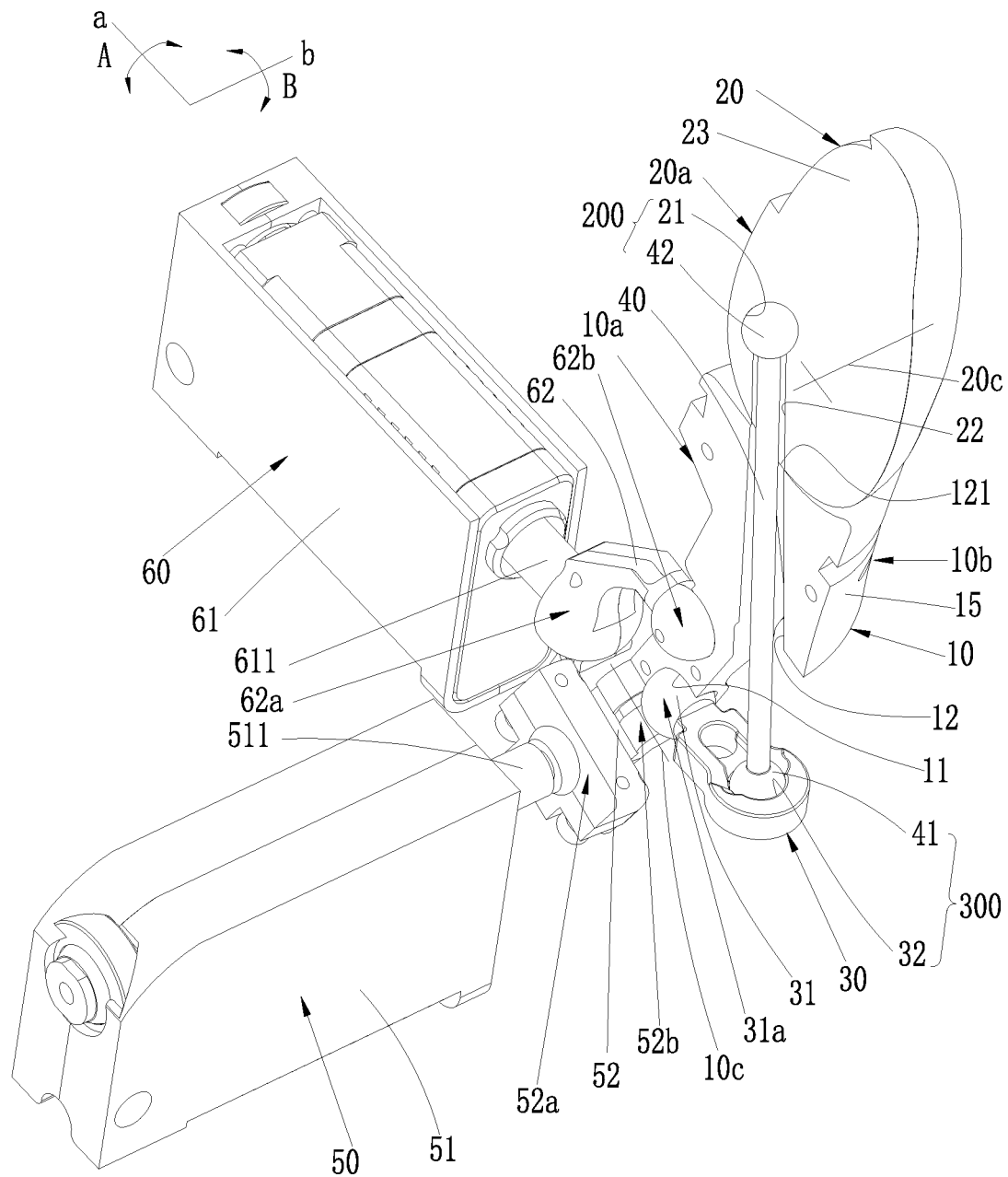
FIG. 4 is similar to FIG. 3, but viewed from a different perspective.

Referring to FIGS. 3 and 4, in one embodiment, a connecting portion 31a of the fixing member 30, which is connected to the proximal phalanx 10, is located between the second ends 52b and 62b of the first transmission rod 52 and the second transmission rod 62, and a distance from the second end 62b of the second transmission rod 62 to the distal phalanx 20 is smaller than a distance from the second end 52b of the first transmission rod 52 to the distal phalanx 20. The distance horn the second end 62b of the second transmission rod 62 to the distal phalanx 20 refers to the distance from the second end 62b of the second transmission rod 62 to the pivot axis 20c of the distal phalanx 20 relative to the proximal phalanx 10. The distance from the second end 52b of the first transmission rod 52 to the distal phalanx 20 refers to the distance from the second end 52b of the first transmission rod 52 to the pivot axis 20c of the distal phalanx 20 relative to the proximal phalanx 10. With such configuration, the first actuating assembly 50 can output a smaller displacement, while the proximal phalanx 10 can swing in the direction A of the first degree of freedom with a larger amplitude. The first transmission rod 52 and the second transmission rod 62 are respectively located on the upper and lower sides of the fixing member 30, which is convenient for the assembly of various parts, and the overall structure is compact.

In one embodiment, the fixing member 30 is arranged adjacent to a back 10b of the proximal phalanx 10, and the second linear actuator 61 is arranged adjacent to a front 10a of the proximal phalanx 10. The first linear actuator 51 is arranged close to a side surface of the proximal phalanx 10, and an end of each of the first output shaft 511 and the second output shaft 611 face proximal phalanx 10. The size of each of the first linear actuator 51 and the second linear actuator 61 is larger than the size of the fixing member 30. Since the first linear actuator 51 and the second linear actuator 61, which are larger in size, are arranged in the palm of the hand, and the fixing member 30 with smaller size is arranged on the back 10b of the proximal phalanx 10, the structure of the hand including the palm and the fingers can be made smaller and has a better anthropomorphic appearance.

In one embodiment, the connecting portion 31a of the fixing member 30, which is connected to the proximal phalanx 10, is located at the back 10b of the proximal phalanx 10, the second end 62b of the second transmission rod 62 is located at the front 10a of the proximal phalanx 10, and a pivot axis 10c about which the first transmission rod 52 and the proximal phalanx 10 rotate passes through the back 10b and the front 10a of the proximal phalanx 10. The first transmission rod 52 driven by the first linear actuator 51 acts on the proximal phalanx 10 to drive the proximal phalanx 10 to swing left and right. The second transmission rod 62 driven by the second linear actuator 61 acts on the proximal phalanx 10 to drive the proximal phalanx 10 to swing back and forth. Since the fixing member 30 is connected to the proximal phalanx 10 by a ball joint, and the linking member 40 is connected to the distal phalanx 20 and the fixing member 30 by ball joints, the linking member 40 and the distal phalanx 20 follow the linking member to realize the bending and extension actions of the distal phalanx 20.

In one embodiment, the second end 52b of the first transmission rod 52 is pivotally connected to a lower end of the proximal phalanx 10, and the first transmission rod 52 is U-shaped and defines a recess 521 for avoiding the lower end of the proximal phalanx 10. With such configuration, when the first linear actuator 51 drives the first transmission rod 52 to drive the proximal phalanx 10 to swing in the direction A of the first degree of freedom, the proximal phalanx 10 is caused to swing in the direction A of the first degree of freedom with greater amplitude and without interference from the first transmission rod 52. In addition, the first linear actuator 51 and the second linear actuator 61 can also be arranged on substantially the same horizontal plane, which facilitates the installation of the first linear actuator 51 and the second linear actuator 61 on the palm structure. Further, the first output shaft 511 of the first linear actuator 51 and the second output shaft 611 of the second linear actuator 61 are on the same plane as the fixing member 30, so that the band structure can be made to require less space.

In one embodiment, the fixing member 30 includes a first ball 31, and the proximal phalanx 10 defines a first spherical socket 11. The first ball 31 is received in the first spherical socket 11. In this way, it is convenient to form the first spherical socket 11 in the proximal phalanx 10, and form the first ball 31 on the fixing member 30. After the first ball 31 is placed in the first spherical socket 11, the ball joint 100 is formed to connect the fixing member 30 to the proximal phalanx 10.

In one embodiment, the fixing member 30 defines a second spherical socket 32, and the distal phalanx 20 defines a third spherical socket 21. The linking member 40 includes a second ball 41 and a third ball 42 at opposite ends thereof. The second ball 41 and the third ball 42 are respectively received in the second spherical socket 32 and the third spherical socket 21. In this way, it is convenient to form the second spherical socket 32 in the fixing member 30, form the third spherical socket 21 in the proximal phalanx 20, and form the second ball 41 and the third ball 42 on opposite ends of the linking member 40. After the balls are placed in the corresponding spherical sockets, the ball joints 200 and 300 are formed to connect the linking member 40 to the fixing member 30 and the distal phalanx 20.

In one embodiment, the proximal phalanx 10 defines a first groove 12 and the distal phalanx 20 defines a second groove 22, and the linking member 40 passes through the first groove 12 and the second groove 22. The second groove 22 communicates with the third spherical socket 21. The grooves are provided to facilitate the installation of the linking member 40. The linking member 40 can be arranged in a phalanx shell, so that the thumb structure has a better anthropomorphic appearance.

In one embodiment, a distance from the center of the second ball joint to a front 20a of the distal phalanx 20 is smaller than a distance from a rotation axis 20c between the distal phalanx 20 and the proximal phalanx 10 to the front 20a of the distal phalanx 20. With such configuration, when the first actuating assembly 50 and the second actuating assembly 60 drive the proximal phalanx 10 to swing freely, the linking member 40 drives the distal phalanx 20 to swing relative to the distal phalanx 20. Furthermore, the resistance, moment of the proximal phalanx 10 and the distal phalanx 20 relative to the lower end of the proximal phalanx 10 is small, so that the actuating assembly can provide a greater output force, and the thumb structure can provide a greater grip.

Referring again to FIG. 1, in one embodiment, the proximal phalanx 10 includes two tabs 13 that are spaced apart from each other, and the two tabs 13 defines a mounting space 14 therebetween. One end of the distal phalanx 20 is rotatably received in the mounting space 14. With such configuration, one end of the distal phalanx 20 can be pivotally connected to the proximal phalanx 10 reliably. One end of the distal phalanx 20 is arranged close to an opening 121 of the first groove 12 of the proximal phalanx 10, and the two tabs 13 block the left and right sides of the opening 121. In this way, an observer can only observe the gaps between the opening 121 at the front side 10a and the back side 1011 of the proximal phalanx 10, reducing the area where the opening 121 is exposed to the outside.

In one embodiment, each of the two tabs 13 defines a receiving hole, and the distal phalanx 20 includes two shafts 231 that are rotatably received in the two receiving holes. Two bearings may be received in the receiving boles to rotatably connect the two shafts 231 to the two tabs 13. The bearings can reduce the friction between the shafts 231 and the inner surfaces of the receiving holes, and the shafts 231 can be reliably received in the receiving holes, so that one end of the distal phalanx 20 can be reliably pivoted to the proximal phalanx 10.

In one embodiment, the proximal phalanx 10 includes two proximal phalanx housings 15, the distal phalanx 20 includes two distal phalanx housings 23, and the linking member 40 is partly received between the two proximal phalanx housings 15 and between the two distal phalanx housings 23. The two phalanx housings are assembled to form a phalanx structure, which is easy to form and assemble, and the connecting rod 40 can be arranged in the knuckle shell, so that the thumb structure has a better anthropomorphic appearance. It also facilitates the assembly of the ball joints. For example, the two proximal phalanx housings 15 are provided with hemispherical sockets at the positions where they are connected to the fixing member 30. The two hemispherical sockets form the first spherical socket 11. When assembling, the first ball 31 of the fixing member 30 is placed into the hemispherical socket of one proximal phalanx housing 15, and the other proximal phalanx housing 15 is covered on the one proximal phalanx housing 15. In this way, the first ball 31 can be installed in the first spherical socket 11 to form the first ball joint 100 to connect the fixing member 30 to the proximal phalanx 10, which is convenient for assembly. In addition, the two phalanx housings can be connected to each other by fasteners.

Figure 10:
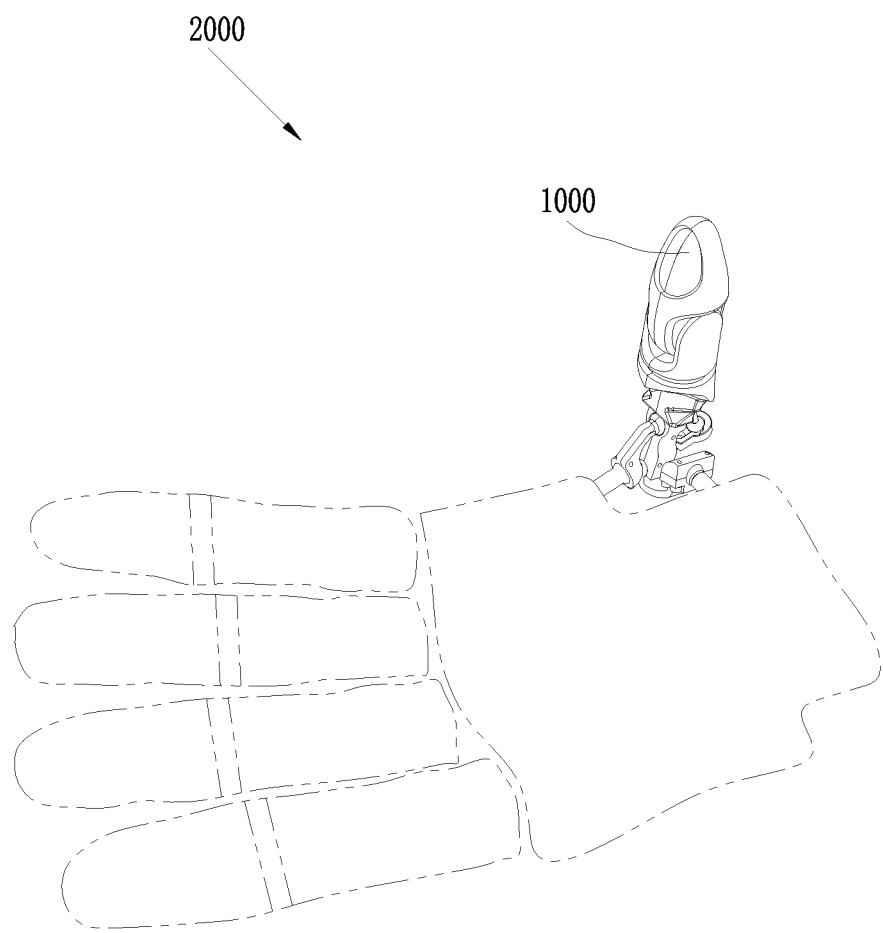
FIG. 10 is a schematic isometric view of a hand of a robot according to one embodiment.

Referring to FIG. 10, in one embodiment, a robot includes a hand 2000 that includes the thumb structure 1000 as described above. Since the robot includes all of the technical features of the above-mentioned embodiments, it also has all the beneficial effects brought by the thumb structure of the above-mentioned embodiments, which will not be repeated here.

The embodiments above are only illustrative for the technical solutions of the present disclosure, rather than limiting the present disclosure. Although the present disclosure is described in detail with reference to the above embodiments, those of ordinary skill in the art should understand that they still can modify the technical solutions described in the foregoing various embodiments, or make equivalent substitutions on partial technical features; however, these modifications or substitutions do not make the nature of the corresponding technical solution depart from the spirit and scope of technical solutions of various embodiments of the present disclosure, and all should be included within the protection scope of the present disclosure.

What is claimed is:

1. A thumb structure comprising:
a proximal phalanx;
a distal phalanx rotatably connected to one end of the proximal phalanx;
a fixing member connected to the proximal phalanx through a first ball joint;
a linking member comprising opposite ends that are connected to the distal phalanx and the fixing member through a second ball joint and a third ball joint;
a first actuating assembly configured to drive the proximal phalanx to swing in a direction of a first degree of freedom; and
a second actuating assembly configured to drive the proximal phalanx to swing in a direction of a second degree of freedom.

2. The thumb structure according to claim 1, wherein the first actuating assembly comprises a first linear actuator comprising a first output shaft, and a first transmission rod comprising opposite ends that are respectively rotatably connected to the first output shaft and the proximal phalanx; the second actuating assembly comprises a second linear actuator comprising a second output shaft, and a second transmission rod comprising opposite ends that are respectively rotatably connected to the second output shaft and the proximal phalanx; the first output shaft and the second output shaft extend along two axes between which an angle is formed.

3. The thumb structure according to claim 2, wherein the first transmission rod comprises a first end that is connected to the first output shaft by a fourth ball joint, and a second end pivotally connected to the proximal phalanx; the second transmission rod comprises a first end that is connected to the second output shaft by a fifth ball joint, and a second end connected to the proximal phalanx by a sixth ball joint; a connecting portion of the fixing member, which is connected to the proximal phalanx, is located between the second ends of the first transmission rod and the second transmission rod, and a distance from the second end of the second transmission rod to the distal phalanx is smaller than a distance from the second end of the first transmission rod to the distal phalanx.

4. The thumb structure according to claim 3, wherein the fixing member is arranged adjacent to a back of the proximal phalanx, the second linear actuator is arranged adjacent to a front of the proximal phalanx, the first linear actuator is arranged close to a side surface of the proximal phalanx, and an end of each of the first output shaft and the second output shaft face the proximal phalanx.

5. The thumb structure according to claim 4, wherein the connecting portion of the fixing member, which is connected to the proximal phalanx, is located at the back of the proximal phalanx, the second end of the second transmission rod is located at the front of the proximal phalanx, and a pivot axis about which the first transmission rod and the proximal phalanx rotate passes through the back and the front of the proximal phalanx.

6. The thumb structure according to claim 3, wherein the second end of the first transmission rod is pivotally connected to a lower end of the proximal phalanx, and the first transmission rod is U-shaped and defines a recess for avoiding the lower end of the proximal phalanx.

7. The thumb structure according to claim 1, wherein the fixing member comprises a first ball, the proximal phalanx defines a first spherical socket, and the first ball is received in the first spherical socket.

8. The thumb structure according to claim 1, wherein the fixing member defines a second spherical socket, the distal phalanx defines a third spherical socket, the linking member comprises a second ball and a third ball at opposite ends thereof, the second ball and the third ball are respectively received in the second spherical socket and the third spherical socket.

9. The thumb structure according to claim 1, wherein the proximal phalanx defines a first groove and the distal phalanx defines a second groove, and the linking member passes through the first groove and the second groove.

10. The thumb structure according to claim 1, wherein a distance from the center of the second ball joint to a front of the distal phalanx is smaller than a distance from a rotation axis between the distal phalanx and the proximal phalanx to the front of the distal phalanx.

11. The thumb structure according to claim 1, wherein the proximal phalanx comprises two tabs that are spaced apart from each other, the two tabs defines a mounting space therebetween, one end of the distal phalanx is rotatably received in the mounting space.

12. The thumb structure according to claim 11, wherein each of the two tabs defines a receiving hole, and the distal phalanx comprises two shafts that are rotatably received in the two receiving holes.

13. The thumb structure according to claim 11, wherein the proximal phalanx comprises two proximal phalanx housings, the distal phalanx comprises two distal phalanx housings, and the linking member is partly received between the two proximal phalanx housings and between the two distal phalanx housings.

14. A robot comprising:
a thumb structure comprising:
    a proximal phalanx;
    a distal phalanx rotatably connected to one end of the proximal phalanx;
    a fixing member connected to the proximal phalanx through a first ball joint;
    a linking member comprising opposite ends that are connected to the distal phalanx and the fixing member through a second ball joint and a third ball joint;
    a first actuating assembly configured to drive the proximal phalanx to swing in a direction of a first degree of freedom; and
    a second actuating assembly configured to drive the proximal phalanx to swing in a direction of a second degree of freedom.

15. The robot according to claim 14, wherein the first actuating assembly comprises a first linear actuator comprising a first output shaft, and a first transmission rod comprising opposite ends that are respectively rotatably connected to the first output shaft and the proximal phalanx; the second actuating assembly comprises a second linear actuator comprising a second output shaft, and a second transmission rod comprising opposite ends that are respectively rotatably connected to the second output shaft and the proximal phalanx; the first output shalt and the second output shaft extend along two axes between which an angle is formed.

16. The robot according to claim 15, wherein the first transmission rod comprises a first end that is connected to the first output shaft by a fourth ball joint, and a second end pivotally connected to the proximal phalanx; the second transmission rod comprises a first end that is connected to the second output shaft by a fifth ball joint, and a second end connected to the proximal phalanx by a sixth ball joint; a connecting portion of the fixing member, which is connected to the proximal phalanx, is located between the second ends of the first transmission rod and the second transmission rod, and a distance from the second end of the second transmission rod to the distal phalanx is smaller than a distance from the second end of the first transmission rod to the distal phalanx.

17. The robot according to claim 16, wherein the fixing member is arranged adjacent to a back of the proximal phalanx, the second linear actuator is arranged adjacent to a front of the proximal phalanx, the first linear actuator is arranged close to a side surface of the proximal phalanx, and an end of each of the first output shaft and the second output shaft face the proximal phalanx.

18. The robot according to claim 17, wherein the connecting portion of the fixing member, which is connected to the proximal phalanx, is located at the back of the proximal phalanx, the second end of the second transmission rod is located at the front of the proximal phalanx and a pivot axis about which the first transmission rod and the proximal phalanx rotate passes through the back and the front of the proximal phalanx.

19. The robot according to claim 16, wherein the second end of the first transmission rod is pivotally connected to a lower end of the proximal phalanx, and the first transmission rod is U-shaped and defines a recess for avoiding the lower end of the proximal phalanx.

20. The robot according to claim 14, wherein the fixing member comprises a first ball, the proximal phalanx defines a first spherical socket, and the first ball is received in the first spherical socket.

* * * * *